(12) United States Patent
Wiltzius et al.

(10) Patent No.: US 8,837,138 B2
(45) Date of Patent: Sep. 16, 2014

(54) REMOVABLE AIRFLOW GUIDE ASSEMBLY WITH A PROCESSOR AIR COOLER AND MEMORY BANK COOLERS

(75) Inventors: Andrew L. Wiltzius, Fort Collins, CO (US); Tom J Searby, Eaton, CO (US); Robert Lee Crane, Fort Collins, CO (US); Adolfo Adolfo Gomez, Golden, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 167 days.

(21) Appl. No.: 13/406,335

(22) Filed: Feb. 27, 2012

(65) Prior Publication Data
US 2013/0222999 A1    Aug. 29, 2013

(51) Int. Cl.
G06F 1/20    (2006.01)
H05K 5/00    (2006.01)
H05K 7/20    (2006.01)
H02B 1/01    (2006.01)

(52) U.S. Cl.
USPC ............ 361/679.46; 361/679.47; 361/679.48; 361/679.49; 361/679.5; 361/679.54; 361/688; 361/689; 361/690; 361/692; 361/694; 361/695; 361/696; 361/697; 361/704; 361/831

(58) Field of Classification Search
USPC ............ 361/679.46, 695, 697, 679.48, 679.5, 361/679.47, 679.49, 688–690, 692, 694, 361/831, 696, 704, 679.54
See application file for complete search history.

(56) References Cited

U.S. PATENT DOCUMENTS

| | | | |
|---|---|---|---|
| 6,272,007 B1 | 8/2001 | Kitlas et al. | |
| 6,822,863 B1 * | 11/2004 | Artman et al. | 361/695 |
| 7,643,292 B1 * | 1/2010 | Chen | 361/695 |
| 7,742,296 B2 * | 6/2010 | Lai et al. | 361/679.5 |
| 7,872,866 B1 | 1/2011 | Wang | |
| 8,009,417 B2 | 8/2011 | Searby et al. | |
| 2004/0095723 A1 * | 5/2004 | Tsai et al. | 361/695 |
| 2005/0168934 A1 | 8/2005 | Wendel et al. | |
| 2008/0024997 A1 | 1/2008 | Ghantiwala | |
| 2009/0116183 A1 * | 5/2009 | Mundt | 361/679.46 |
| 2010/0265658 A1 * | 10/2010 | Sawai et al. | 361/694 |
| 2011/0080700 A1 | 4/2011 | Bland et al. | |
| 2011/0279964 A1 | 11/2011 | Zhang et al. | |

* cited by examiner

*Primary Examiner* — Anthony Haughton
*Assistant Examiner* — Zhengfu Feng
(74) *Attorney, Agent, or Firm* — Caroline Pinkston

(57) ABSTRACT

Examples disclose a removable air guide assembly with a processor air cooler to direct air over a processor on a circuit board, the processor air cooler is not directly aligned over the processor. Further, the examples provide the removable airflow guide assembly with memory bank coolers to direct air over memory banks also positioned on the circuit board. Additionally, the examples also disclose the removable airflow guide assembly with a connector socket to align with the circuit board and provide power to the processor air cooler and the memory bank coolers.

15 Claims, 8 Drawing Sheets

REMOVABLE AIRFLOW GUIDE ASSEMBLY WITH A PROCESSOR AIR COOLER AND MEMORY BANK COOLERS

BACKGROUND

Computing devices typically support various components which may emit heat during use. As the heat increases, the reliability and/or operation of various components may be comprised. This may cause unpredictable behavior and even failure of the various components and/or the computing device.

BRIEF DESCRIPTION OF THE DRAWINGS

In the accompanying drawings, like numerals refer to like components or blocks. The following detailed description references the drawings, wherein.

DETAILED DESCRIPTION

Figure 1:
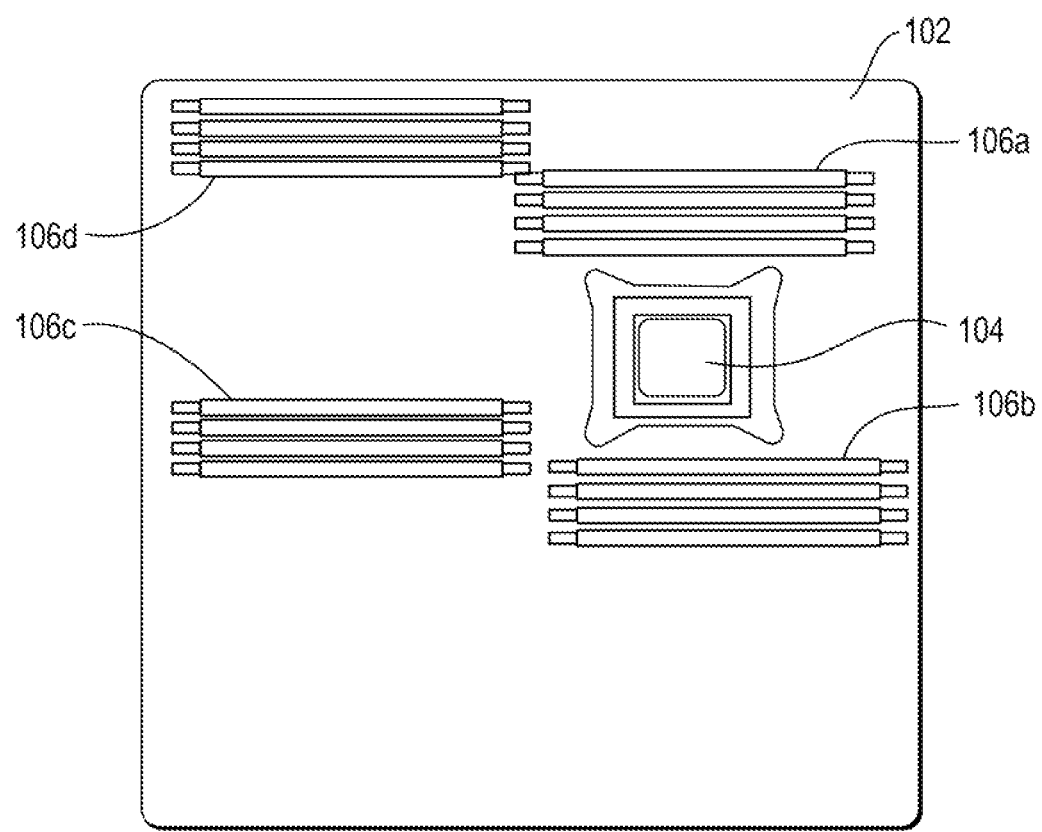
FIG. 1 is a block diagram from an overview perspective of an example circuit board including a processor and memory banks positioned on the circuit board prior to an installation of a removable airflow guide assembly with a processor air cooler and memory bank coolers.

Computing devices may include cooling units to dissipate heat within the various components. However, these cooling units may block access to various internal computing device components. This creates difficulties in servicing and/or upgrading the various internal computing device components. For example, a fan may be included in a computing device to cool a processor, but to upgrade or service this processor, the fan needs to be removed by a person with technical knowledge and accuracy to gain access to the processor. Alternatively, each cooling unit utilized to decrease the temperature within a computing device, may not adequately decrease the computing device temperature. For example, airflow from a heated processor may mix into input airflow to cool another processor, thus increasing the overall computing device temperature. Further still, the cooling units may be large and bulky, causing space constraints in a computing device chassis.

To address these issues, example embodiments disclose herein provide a removable airflow guide assembly with a processor air cooler and memory bank coolers. Including the removable airflow guide with a processor air cooler and memory bank coolers, enables the airflow guide to be removed with the coolers. This allows easier access to upgrade and/or service various internal computing device components. The processor air cooler directs cool air over a processor and is not directly aligned over the processor. This allows fresh cool air to enter the processor air cooler to enable a more efficient way to cool the processor. The memory bank coolers direct cool air over the memory banks. Additionally, the removable airflow guide includes a connector socket to align with the circuit board, allowing power to be provided to the processor air cooler and memory bank coolers. Including a connector socket within the removable airflow guide, allows the entire removable airflow guide to be removed with a user-friendly single action. Including the removable airflow guide assembly with a socket connection allows power to be delivered to the processor air cooler and memory bank coolers without additional external wiring. Further, including the processor air cooler and memory bank coolers on the removable airflow guide assembly also blocks some of the internal cooling noise, thereby reducing the noise output to a computing device user.

Additionally, in the various examples disclosed herein, the removable airflow guide assembly includes a processor air cooler at substantially 45 degrees to the printed circuit board. In this embodiment, positioning the processor air cooler at substantially 45 degrees to the circuit board allows more cool air to enter an inlet to the processor air cooler, enabling a more efficient manner to cool the processor. Additionally, placing the processor air cooler at the position 45 degrees to the circuit board enables a more compact design of the processor air cooler and memory bank coolers.

In another embodiment, the removable airflow guide assembly includes a first wall on the backside of the processor air cooler to deflect the flow of preheated air from the processor and a second wall to deflect the flow of preheated air from each of the memory banks. Including the first and second walls between the various internal computing device components, prevents preheated air from each of the various internal computing device components from entering an inlet of each cooler. This allows for more cool air to enter the cooler to direct on the various internal computing device components. Additionally, this allows better airflow isolation between the processor and each of the memory banks.

In a further embodiment, the outlet for each of the memory bank coolers are offset from the inlet of the processor air cooler to prevent preheated air from each of the memory banks positioned on the circuit board from entering the inlet of the processor air cooler. Offsetting the memory bank coolers from the inlet of the processor air cooler further allows additional cool air to enter each cooler to cool the processor and memory banks.

Further still, another embodiment includes a liquid cooled radiator module positioned substantially over a processor positioned on the circuit board. This reduces the complexity of the system and provides flexibility by modifying the arrangement for the processor air cooler and the memory bank coolers. For example, the liquid cooled radiator module may be included substantially over the processor reducing the amount of wiring need to connect to the other side of the circuit board.

In summary, example embodiments disclosed herein provide easier access to upgrade and/or service various internal computing device components by enabling the removable airflow guide assembly with the processor air cooler and memory bank coolers to be removed with a user-friendly single action. Further, example embodiments enables a more efficient manner to cool the various internal computing device components by preventing preheated air from each of the various internal computing device components from entering an inlet of each of the cooling units, thus providing cooler air to the various internal computing components.

Referring now to the drawings, FIG. 1 is a block diagram of a circuit board 102 from an overview perspective. The circuit board 102, processor 104, and memory banks 106a-106d are utilized in the operation of a computing device and these components 104 and 106a-106d may emit much heat affecting the operation of the computing device. The circuit board 102 including the processor 104 and memory banks 106a-106d are installed within a chassis of the computing device as will be explained and detailed in later figures. Specifically, FIG. 1 includes the circuit board 102 with a processor 104 and memory banks 106a, 106b, 106c, and 106d prior to an installation of a removable airflow guide assembly with a processor air cooler and memory bank coolers. The removable airflow guide assembly includes a processor air cooler, memory bank coolers, and connector socket positioned above the circuit board 102. As such, FIG. 1 is for illustration purposes of the various components within a computing device underneath the removable airflow guide assembly. The removable airflow guide assembly will be explained in detail in later figures.

The circuit board 102 is used to mechanically support and connect the components 104 and 106a-106d. Embodiments of the circuit board 102 include a printed circuit board, breadboard, printed circuit assembly, printed wiring board, substrate, or other circuit board suitable to mechanically support and connect the components 104 and 106a-106d.

The processor 104 is an electrical component to control the hardware and execute software (i.e., computer readable instructions) within the computing device. The processor 104 may include socket connectors connected into the corresponding connectors on the circuit board 102. Embodiments of the processor 104 include a microchip, chipset, electronic circuit, microprocessor, semiconductor, microcontroller, central processing unit (CPU), graphics processing unit (GPU), visual processing unit (VPU), or other programmable device capable of controlling and interacting with hardware and executing programs and/or instructions. In a further embodiment, the processor 104 may include other various internal components not depicted in FIG. 1, such as an additional processor. For example, the additional processor may be positioned on the circuit board 102 in between the memory banks 106c and 106d. This embodiment will be explained in detail in later figures.

The memory banks 106a-106d are electrical components used as logical units to store and/or execute various instructions and/or data within the computing device. The memory banks 106a-106d may include memory modules connected into the corresponding connectors on the circuit board 102. Embodiments of the memory banks 106a-106d include a local memory, memory, memory buffer, volatile memory, random access memory (RAM), Electrically Erasable Programmable Read-Only memory (EEPROM), storage drive, a Compact Disk Read-Only Memory (CDROM), or other physical memory device capable of storage and/or execution of various instructions and/or data within the computing device. Although memory banks 106a-106d are not positioned in direct alignment with one another, embodiments should not be limited as the memory banks 106a-106d may also be directly aligned with each other. Further, FIG. 1 depicts four memory banks 106a-106d, embodiments should not limited to this illustration as memory banks 106a-106d may include only two memory banks 106a and 106b, etc. In a further embodiment, memory banks 106a-106d are positioned on either side of processor 104 as depicted with memory banks 106a and 106b.

Figure 2:
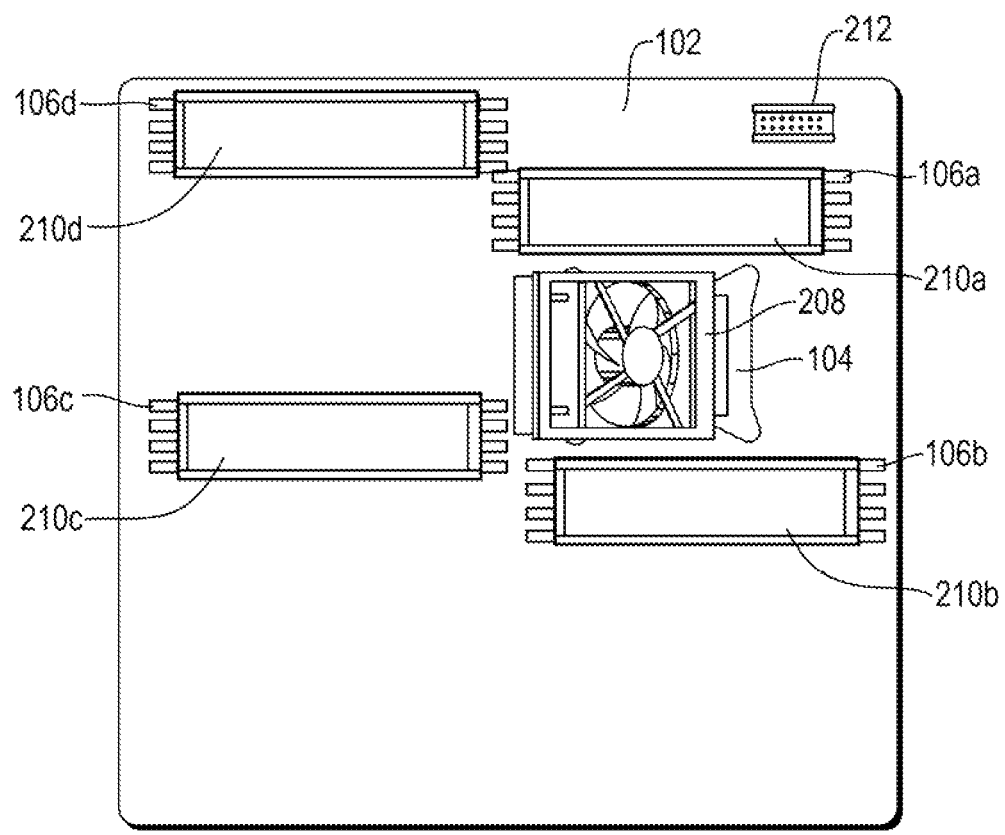
FIG. 2 is a block diagram from an overview perspective of an example circuit board including a processor with a processor air cooler, memory bank coolers, and a connector socket.

FIG. 2 is a block diagram of an example circuit board 102 including processor 104, processor air cooler 208, memory banks 106a-106d, memory bank coolers 210a-210d, and a connector socket 212 without the mechanical support of the removable airflow guide assembly. This was done for illustration purposes rather than for limiting embodiments. For example, FIG. 2 depicts the processor air cooler 208, the memory bank coolers 210a-210d, and the connector socket 212 as free floating with no attachment to the mechanical support. Rather, depicting a removable airflow guide assembly with the mechanical support that includes the processor air cooler 208, memory ban coolers 210a-210d, and connector socket 212 is explained in detail in later figures. The circuit board 102, the processor 104, and the memory banks 106a-106d include similar functionality and structure as in FIG. 1.

The processor air cooler 208 is included as part of the removable airflow guide and is positioned to intake cool or fresh air to blow over processor 104. For example, the processor air cooler 208 draws cooler air from inside a computer chassis and expels the preheated air from the processor 104. The processor air cooler 208 may also include a filtering cover to the cooler 208 as to filter any debris or particles prior to drawing in air. In another example, the processor air cooler 208 draws cooler air from inside the computer chassis to move air across a heatsink to cool the processor 104 by decreasing the temperature. In one embodiment, the processor air cooler 208 is positioned between 0 and 90 degrees to the circuit board 102. In another embodiment, the processor air cooler 208 is positioned at substantially 45 degrees to the circuit board 102. In a further embodiment, there may include a wall on the backside of the processor air cooler 208 to deflect preheated air from the processor 104 to prevent the preheated air from combining with preheated air from other various components 106a-106d. Yet, in a further embodiment, the circuit board 102 may include an additional processor positioned between the memory banks 106c and 106d, as such, an additional processor air cooler may be installed above this processor and between the memory banks 106c and 106d. Embodiments of processor air cooler 208 include a fan, blower, heatsink, or other cooler capable of cooling the processor 104.

The memory bank coolers 210a-210d are positioned substantially above the respective memory banks 106a-106d. The memory bank coolers 210a-210d intake fresh air on the side facing away from processor 104 and directs the air at 90 degrees on each memory bank 106a-106d. In one embodiment, there may be a wall between the memory bank coolers 210a-210d to deflect the preheated air from each memory bank 106a-106d from entering other memory bank coolers 210a-210d. In another embodiment, the memory bank coolers 210a-210d are one type of cooler while the processor air cooler 208 is a second type of cooler. For example, the memory bank coolers 210a-210d may include a blower while the processor air cooler 208 includes a fan. In a further embodiment, one of the memory bank coolers 210a-210d includes an axial fan. This embodiment allows that cooler to direct air directly over one of the memory banks 106a-106d and an additional electrical component positioned at or near one of the memory banks 106a-106d to dissipate heat across a greater area on the circuit board 102. For example, the memory bank 106a may include a voltage regulator next to it, as such by using the axial fan as the memory bank cooler 210a, the voltage regulator and the memory bank 106a may both be cooled to decrease temperature. Embodiments of the memory bank coolers 210a-210d include a blower, fan, heatsink, or other cooler capable of cooling the corresponding memory banks 106a-106d. Including the memory bank coolers 210a-210d positioned substantially over the memory banks 106a-106d localizes airflow, creating a separate memory bank 106a-106d airflow, which prevents preheated air from each memory bank 210a-210d from mixing with preheated air from other memory banks 210a-210d.

The connector socket 212 provides a connection from the circuit board 102 to the removable airflow guide assembly to enable the processor air cooler 208 and the memory bank coolers 210a-210d to receive power to operate. Connector socket 212 may also provide guidance in how to install the removable airflow guide assembly by providing alignment with the circuit board 102. Embodiments of connect socket 212 includes a male connection, female connection, or other component suitable for connecting the removable airflow guide assembly to the circuit board 102.

Figure 3:
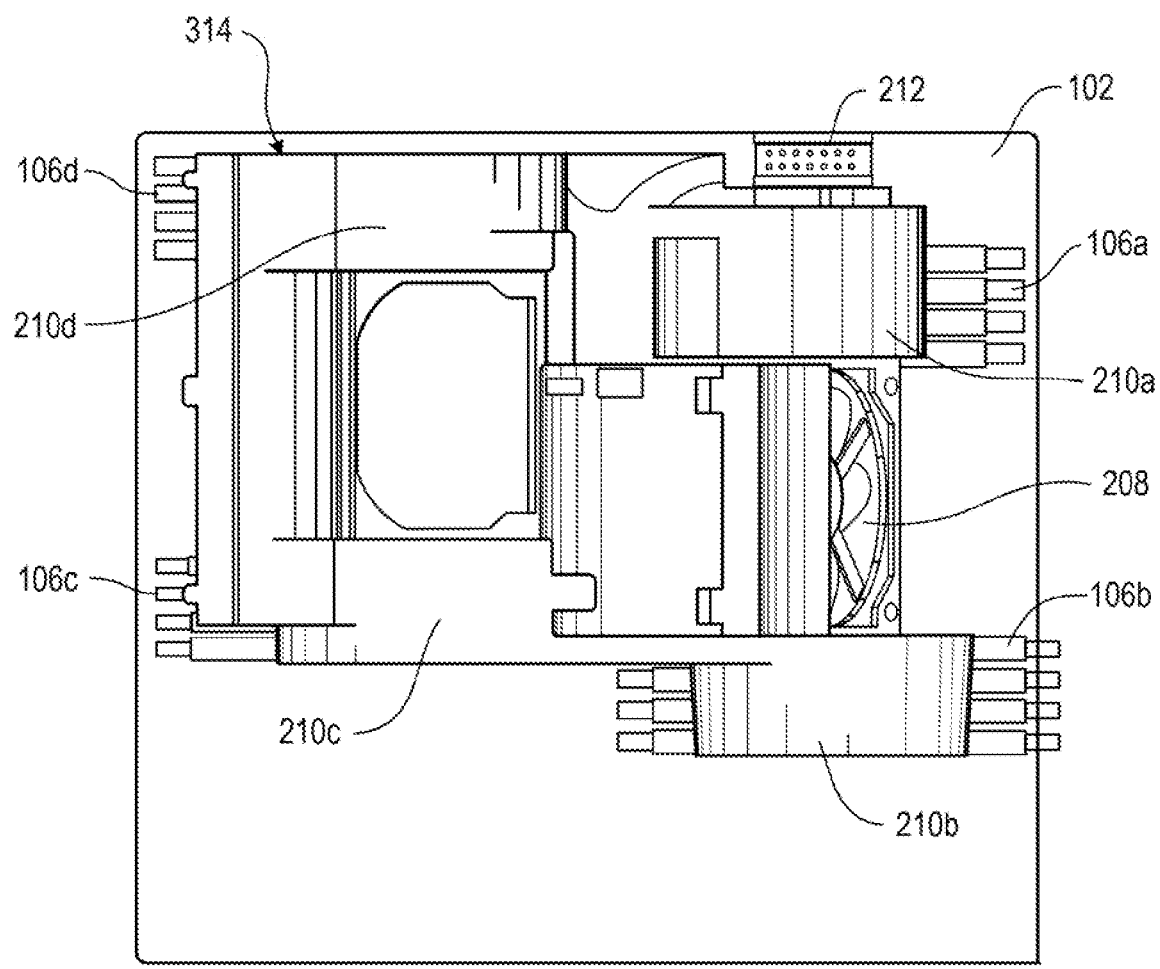
FIG. 3 is a block diagram from an overview perspective of an example removable airflow guide assembly installed on a circuit board including a processor air cooler and memory bank coolers.

FIG. 3 is a block diagram of a removable airflow guide assembly installed on a circuit board 102 from an overview perspective. Specifically, the removable airflow guide assembly includes mechanical support 314, a processor air cooler 208, memory bank coolers 210a-210d, and connector socket 212. Unlike earlier figures, FIG. 3 depicts the removable airflow guide assembly including the mechanical support 314 to support the structure of the coolers 208 and 210a-210d. The circuit board 102, memory banks 106a-106d, processor air cooler 208, memory bank coolers 210a-210d may include similar functionality and structure as in FIG. 1 and FIG. 2.

The mechanical support 314 is positioned over the circuit board 102 with the various components including a processor and memory banks 106a-106d to enable cooling in an efficient manner. Specifically, the mechanical support 314 includes the structure and housing consisting of the duct assembly to support the processor air cooler 208 positioned over a processor, memory bank coolers 210a-210d positioned over memory banks 106a-106d, and connector socket 212 to align with the circuit board 102. The mechanical support 314 houses the processor air cooler 208 between 0 and 90 degrees to the circuit board 102, as such, the processor air cooler 208 is positioned above so the processor is underneath. For example, the processor air cooler 208 may be positioned 90 degrees to the circuit board 102, and as such, would be in a perpendicular angle to the circuit board 102. In this example, the processor air cooler 208 would intake fresh air 90 degrees to the circuit board 102 to blow over the processor underneath the processor air cooler 208. In one embodiment, the mechanical support 314 houses the processor air cooler 208 above a processor at substantially 45 degrees to the circuit board 102. Substantially 45 degrees to the circuit board 102 includes a range between +/−15 degrees from 45 degrees. For example, the processor air cooler 208 may be positioned at 30 degrees to 60 degrees over the circuit board 102. In another embodiment, the mechanical support 314 includes a first wall on a side of the processor air cooler 208 and a second wall to separate the memory bank coolers 210a-210d. In a further embodiment, the mechanical support 314 may include an additional processor air cooler and an airflow guide cover. Further still, in another embodiment the mechanical support 314 may divide the main airflow channel into a processor airflow channel to cool the processor and a memory airflow channel to cool the memory banks 106a-106d. In a further embodiment, the mechanical support may include an inner airflow guide assembly and an airflow guide cover. These embodiments will be explained in detail in later figures.

Figure 4:
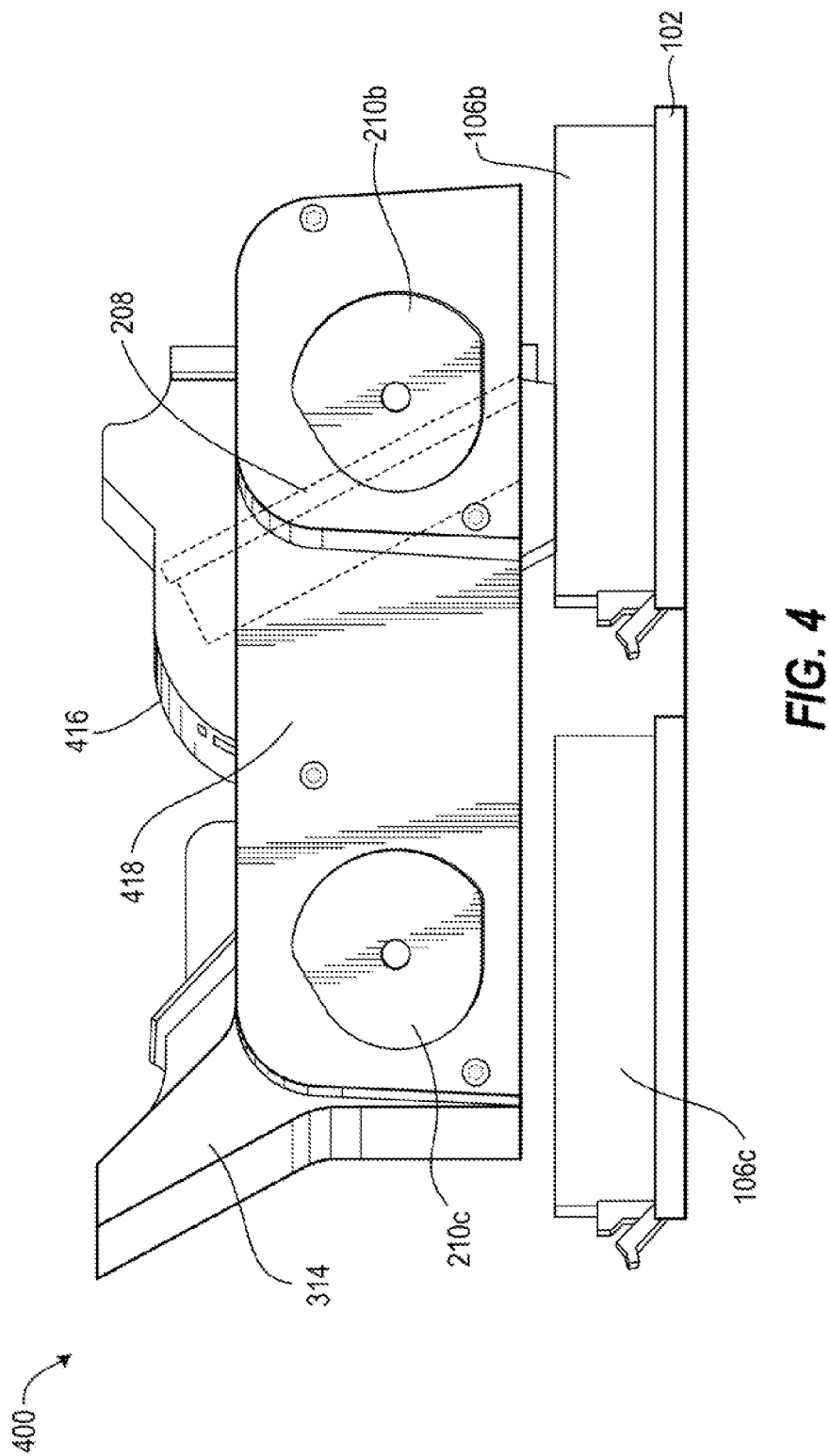
FIG. 4 is a block diagram from a side perspective of an example removable airflow guide assembly including a first wall and second wall with a processor air cooler and memory bank coolers prior to installation on a circuit board with memory banks.

FIG. 4 is a block diagram from a side perspective of an example removable airflow guide assembly 400 including a first wall 416 on a backside of the processor air cooler 208 and a second wall 418 between the memory bank coolers 210b and 210c prior to installation on a circuit board 102. FIG. 4 is a side perspective of the example removable guide assembly 400 and as such, the view may be limited as to other components on the circuit board 102, such as a processor and additional memory banks, and corresponding memory bank coolers. This was done for illustration purposes rather than to limit embodiments. For example, processor 104 as in FIG. 1 may be included on the other side of the memory bank 106b and below the processor air cooler 208. In a further example, additional memory banks may be included on the far side, such as 106a and 106d as in earlier figures. The circuit board 102, memory banks 106b and 106c, memory bank coolers 210b and 210c, processor air cooler 208 may include similar functionality and structure as in FIGS. 1-3.

Removable airflow guide assembly 400 includes the mechanical support 314, the processor air cooler 208, the memory bank coolers 210b and 210c, the first wall 416, and the second wall 418.

The circuit board 102 includes memory banks 106b and 106c and a processor (i.e., not depicted in FIG. 4). The circuit board 102 with these components, is located within a chassis of a computing device.

The processor air cooler 208 as indicated by the dotted line, is on the other side of the memory bank cooler 210b and below the first wall 416. The dotted line represents an object not typically viewable from this perspective as the memory bank cooler 210c would block the view of the processor air cooler 208. However, for illustration purposes, this cooler 208 has been depicted with a dotted line. In another embodiment, the processor air cooler 208 is positioned at substantially 45 degrees to the circuit board 102. Including the processor air cooler 208 as part of the removable airflow guide assembly 400 enables a user of the computing device to remove the entire fixture to service and/or upgrade the various components on the circuit board 102. Additionally, positioning the processor air cooler 208 at substantially 45 degrees to the circuit board 102, allows more cool air to enter the inlet of the processor air cooler 208. Further, positioning the processor air cooler 208 at 45 degrees provides flexibility in the instance there may be space constraints, thus enabling a more compact design of the removable airflow guide assembly 400.

The first wall 416 on a side of the processor air cooler 208 deflects the flow of preheated air from the processor. In this figure, the processor air cooler 208 is angled on the backside of the processor air cooler 208 since the cooler 208 receives fresh air on the side opposite from the circuit board 102. The backside of the processor air cooler 208 is the side that blows air onto the processor positioned on the circuit board 102. The first wall 416 may be parallel to the circuit board 102 and convex toward the backside of the processor air cooler 208. In this embodiment, the first wall 416 is angled toward the backside of the processor air cooler 208 and adjacent to second wall 418. In another embodiment, an additional processor air cooler is positioned behind the processor air cooler 208. In this embodiment, the first wall 416 is positioned on the backside of the processor air cooler 208 as to prevent preheated air from the processor on the circuit board 102 from entering the inlet of an additional processor air cooler. Additionally, the first wall 416 is positioned as to create a separate channel of processor airflow within the main airflow channel (i.e., interior of the chassis). The first wall 416 enables the processor air cooler 208 to direct the preheated air from the processor toward the back of the removable airflow guide assembly 400 to exit through the back of the chassis.

The second wall 418 is adjacent to the first wall 416 and positioned between the memory bank coolers 210b and 210c and the processor air cooler 208. The second wall 418 deflects the flow of preheated air from the memory banks 106b and 106c. The second wall 418 is placed as perpendicular to the circuit board 102. Additionally, the second wall 418 creates a memory bank airflow channel separate from the processor airflow channel within the main airflow channel. The second wall 418 directs the preheated airflow from each of the memory banks 106b and 106c toward the back of the removable airflow guide assembly 400. For example, the second wall 418 directs preheated air from the memory bank 106b past the memory bank 106c and toward the back of the removable airflow guide assembly 400 to exit in the back of the chassis.

Figure 5:
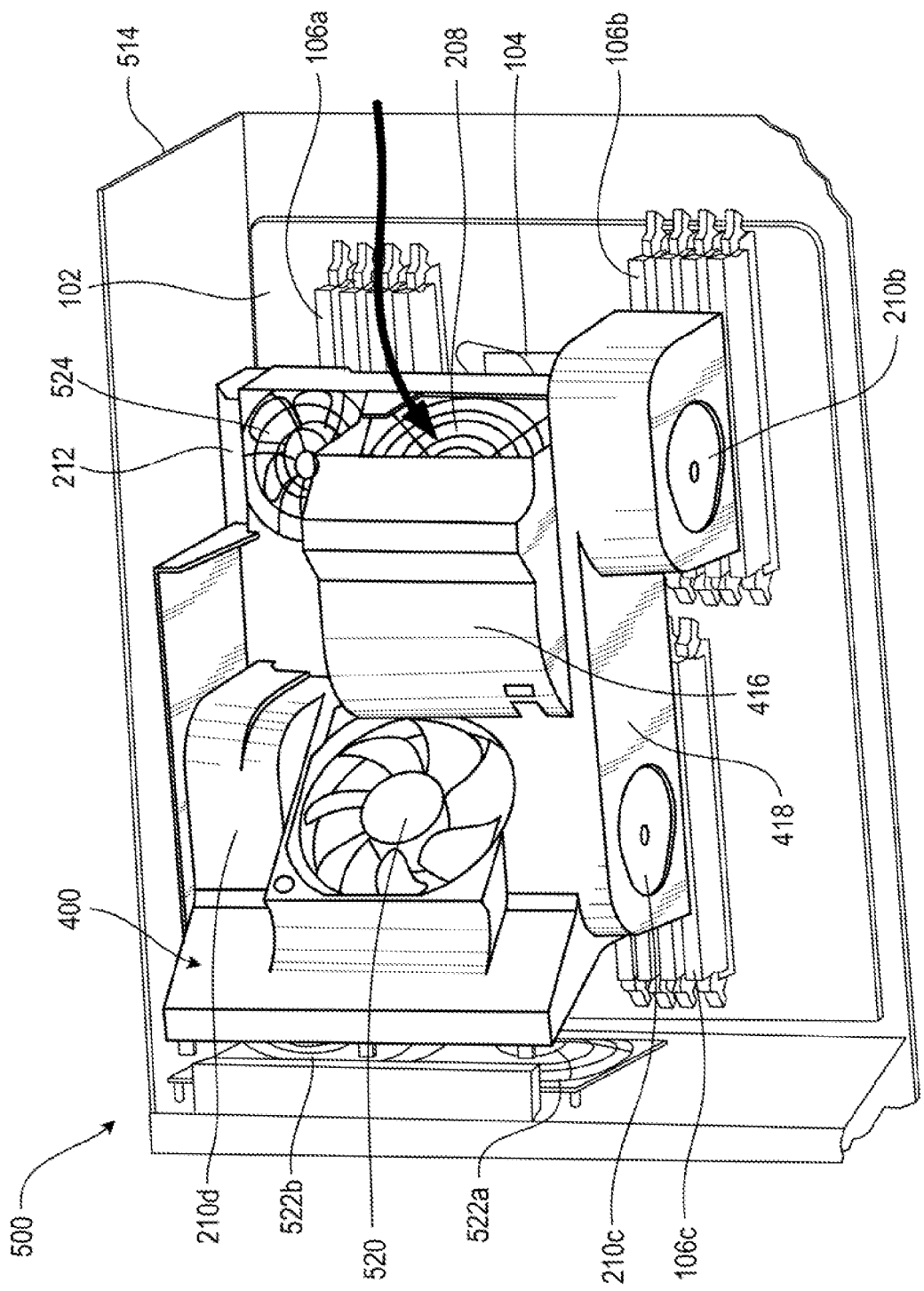
FIG. 5 is a block diagram from an angled overview perspective of an example removable airflow guide assembly with a first wall and a second wall with processor air coolers, memory bank air coolers, and an axial fan within a chassis.

FIG. 5 is a block diagram from an angled overview perspective of an example removable airflow guide assembly 400 with a first wall 416 between the processor air coolers 208 and 520, second wall 418 between the memory bank coolers 210b-210d, an axial fan 524 to cool memory bank 106a, and connector socket 212. The removable airflow guide 400 is installed on a circuit board 102 within a chassis 514 located within a computing device 500. Embodiments of the computing device 500 include a client device, hard drive, personal computer, desktop computer, laptop, a mobile device, or other computing device suitable to include memory banks 106a-106d and processors 104.

The processor 104 is located underneath the processor air cooler 208 and the first wall 416 on the circuit board 102. Further an additional (i.e., a second) processor may be included on the circuit board 102 and as such, the removable airflow guide assembly 400 would include processor air cooler 520 to cool the additional processor on the circuit board 102. The processor 104, removable airflow guide assembly 400, and processor air cooler 208 may include the similar functionality and structure as in FIGS. 1-4.

Memory banks 106a-106c are positioned on the circuit board 102 within chassis 514. Memory bank 106d as in earlier figures is located underneath the corresponding memory bank cooler 210d and as such is not illustrated in this figure. The memory bank coolers 210b-210d are positioned above the memory banks 106a-106d to cool each of the memory banks 106a-106d. In one embodiment, the memory bank coolers 210b-210d are offset from the processor air coolers 208 and 520. In this embodiment, the outlet (i.e., expulsion of air) of each memory bank cooler 210b-210d is located below the inlet of the processor air coolers 208 and 520 as to prevent preheated air from the processor 104 to combine with the preheated air from the memory banks 106a-106c. The memory banks 106a-106c and memory bank coolers 210b-210d may include similar functionality and structure as in FIGS. 1-4.

The first wall 416 and the second wall 418 deflect the flow of preheated air from the processor 104 and the memory banks 106a-106c from mixing among each other. The first wall 416 enables the processor air cooler 208 to direct the preheated air from the processor 104 from entering the inlet of the processor air cooler 520. The first wall 416 further enables the preheated air from the processor to be directed toward the back of the removable airflow guide assembly 400 to exhaust fans 522a and 522b on the chassis 514. The second wall 418 enables the memory bank coolers 210b-210d to direct the preheated air from the memory banks 106a-106c toward the back of the removable airflow guide assembly 400 and pass by each of the memory banks 106a-106c to flow to the exhaust fans 522a and 522b in the rear of the chassis 514. The first wall 416 and the second wall 418 may include similar functionality and structure as in FIG. 4.

The chassis 514 is a framework for a computing device that supports the various internal components, such as a motherboard, etc. The chassis 514 includes vented areas, although not depicted in FIG. 5, to enable air to enter the interior of the chassis 514. This allows the processor air coolers 208 and 520 and memory bank coolers 210b-210d to obtain fresh air to direct onto various internal computing components 104 and 106a-106c. The chassis 514 includes vented areas to enable airflow within the interior of the chassis 514. Additionally, the processor air cooler 208 and the memory bank coolers 210b-d and 524 reside within the chassis 514 and as such, reside in the main airflow channel of chassis 514. The main airflow channel is the area that resides within the chassis 514.

The processor air cooler 520 is located above the additional processor (i.e., the second processor) that may be installed on the circuit board 102 between the memory banks 106c and 106d. Specifically, the processor air cooler 520 is installed in the removable airflow guide assembly 400 once the additional processor is installed on the circuit board 102. The first wall 416 enables more fresh air to enter the processor air cooler 520. For example, the processor air cooler 208 intakes air as indicated with an arrow, the first wall 416 deflects the preheated air from the processor 104, which allows fresh air for the processor air cooler 520 to enter which is used to cool the additional processor below the processor air cooler 520. In this regard, preheated air from the processor 104 on the circuit board 102 is deflected from entering the processor air cooler 520, preventing the combination of preheated air among the processor 104 and the additional processor.

The memory bank axial fan cooler 524 is located substantially over memory bank 106a as part of the removable airflow guide assembly 400. In this embodiment, including one of the memory bank coolers 210a-210d as an axial fan, allows the cooler 524 to cool a greater area on the circuit board 102 and as such, may include cooling an additional component located at or in near proximity to the memory bank 106a. For example, this may include a voltage regulator in close proximity to the memory bank 106a.

The exhaust fans 522a and 522b are mounted to the chassis 514 of the computing device 500 and draw out the preheated air from within the chassis 514. Specifically, the exhaust fans 522a and 522b pulls out preheated air from within the chassis 514 and expels it to outside of the chassis 514. The memory bank coolers 210b-210d cause the preheated air from the corresponding memory banks 106a-106c to exit the chassis 514 through the exhaust fans 522a and 522b. For example, the preheated air circulation from the corresponding memory bank cooler 210c causes preheated air from the memory bank 106c to flow towards the rear of the chassis 514 to exit through the exhaust fans 522a and 522b. In addition to directing the flow of preheated air to exit the chassis 514 through the exhaust fans 522a and 522b, the removable airflow guide 400 blocks the acoustic noise. For example, the coolers 208, 210b-d, 525 and exhaust fans 522a and 522b may propagate the output noise from within the chassis 514 and as such, this limits the amount of noise outside of the chassis 514.

Figure 6:
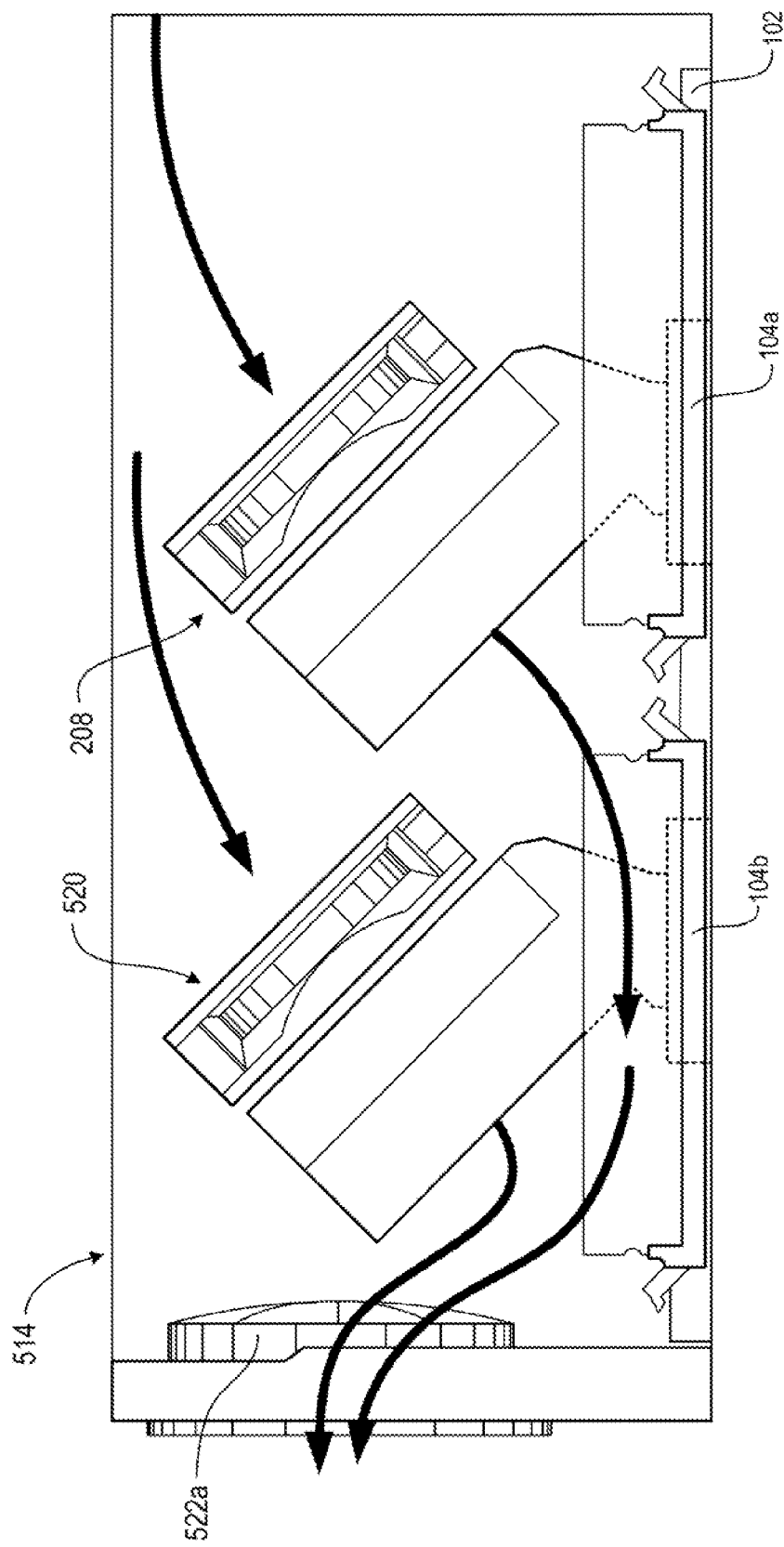
FIG. 6 is a block diagram from a side perspective of an example airflow path between processor air coolers angled at substantially 45 degrees to a circuit board.

FIG. 6 is a block diagram from a side perspective within a chassis 514 of an example airflow path between processor air coolers 208 and 520 positioned at substantially 45 degrees to the circuit board 102 and processors 104a and 104b. The circuit board 102, the processor air coolers 208 and 520, the chassis 514, and exhaust fan 522a may be similar in functionality and structure as in FIGS. 1-5. Additionally, the processor air coolers 208 and 520 and the processors 104a and 104b would not be viewable within a removable airflow guide assembly as memory banks and memory bank coolers would block a view of these components. Rather, FIG. 6 depicts the airflow path between the processor air coolers 208 and 520 and processors 104a and 104b.

The processors 104a and 104b are positioned on circuit board 102 and underneath the processor air coolers 208 and 520. The processors 104a and 104b may be similar in functionality and structure of processor 104 as in FIGS. 1-5 and as such, embodiments may include microchips, chipsets, electronic circuits, microprocessors, semiconductors, microcontrollers, central processing units (CPU), graphics processing units (GPU), visual processing units (VPU), or other programmable devices capable of controlling and interacting with hardware and executing programs and/or instructions. In other embodiments, processors 104a and 104b may be the same type of processor, while in another embodiment, processor 104a is one-type of processor while processor 104b is a second type of processor.

As indicated from the arrows, preheated air from the processor 104a flows around processor 104b and under the processor air cooler 520. The exhaust fan 522a intakes the preheated air from the rear of the chassis and expels it outside of the chassis. For example, fresh air enters the inlet of the processor air cooler 208 and the preheated air is directed around and under the processor air cooler 520. The processor air cooler 520 intakes fresh air as indicated with the arrow from over the processor air cooler 208 and directs the preheated air from the processor 104b toward the exhaust fan 522a and the back of the chassis 514.

Figure 7:
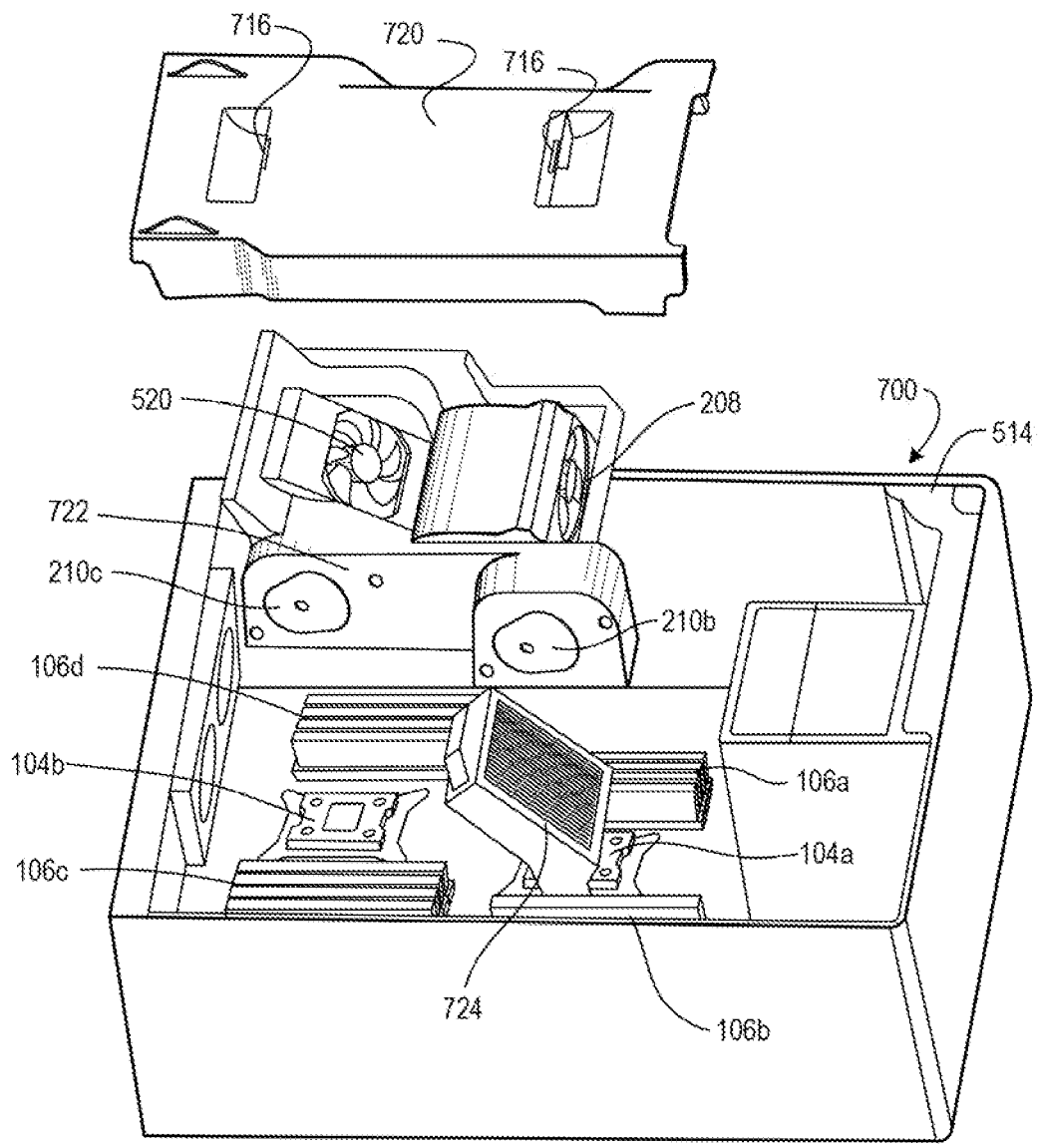
FIG. 7 is a block diagram from an overview perspective of an example removable airflow guide assembly with an airflow guide cover and an inner airflow guide with a processor air cooler and memory bank coolers prior to installation in a chassis with a liquid cooled radiator module over a processor.

FIG. 7 is a block diagram from an angled overview perspective of a chassis 514 of computing device 700 with a removable airflow guide assembly including an airflow guide cover 720 and inner airflow guide assembly 722. The inner airflow guide assembly 722 includes processor air coolers 208 and 520 and memory bank coolers 210b and 210c prior to installation in a chassis 514. The chassis 514 includes a circuit board with memory banks 106a-106d, processors 104a and 104b, and a liquid cooled radiator module 724 used to cool the processor 104a. The processors 104a and 104b, the memory banks 106a-106d, the processor air coolers 208 and 520, and the chassis 514 may include similar functionality and structure as in FIGS. 1-6. The memory bank coolers 210b and 210c included on the inner airflow guide assembly 722 may also include the memory bank coolers 210a and 210d although not visible in FIG. 7 as these coolers 210a and 201d may be located on the far side of the inner airflow guide assembly 722. The memory bank coolers 210a-210d may include similar functionality and structure to the memory bank coolers 210a-210d as in FIGS. 1-6. The computing device 700 may be similar in structure and functionality to the computing device 500 as in FIG. 5.

The inner airflow guide assembly 722 includes the processor air coolers 208 and 520 and the memory bank coolers 210b and 210c. Additionally, the inner airflow guide assembly 722 may include the connector socket 212, although not visible in this figure as the connector socket is on the far side of the inner airflow guide assembly 722. In another embodiment, the inner airflow guide assembly 722 may include a first wall on the backside of the processor air cooler 208 to deflect the flow of preheated air from the processor 104a from entering the processor air cooler 520. In this embodiment, the inner airflow guide assembly 722 may include a second wall to deflect the preheated air from the memory banks 106a-106d from combining among each other. In a further embodiment, the inner airflow guide assembly 722 separates the interior of the chassis (i.e., the main airflow channel) into a processor airflow channel and a memory bank airflow channel.

The airflow guide cover 720 attaches to the inner airflow guide assembly 722, to form the removable airflow guide assembly. Further, the airflow guide cover 720 attaches to the inner airflow guide assembly 722 using attachments 716. Additionally, the insets of the attachments 716 may also be used for a user to place their hands for removal and placement of the removable airflow guide to and from the chassis 514. Embodiments of the attachments 716 may include clip, hook, slide, snap, or other attachment capable of attaching the inner airflow guide assembly 722 to the airflow guide cover 720.

The liquid cooled radiator module 724 is positioned over the processor 104a and below the inner airflow guide assembly 722. Additionally, the liquid cooled radiator module 724 may be attached to the chassis 514, a circuit board, and/or the inner airflow guide assembly 722. In an embodiment the liquid cooled radiator module 724 is positioned at substantially 45 degrees to the circuit board and used in place of the processor air cooler 208. In a further embodiment, the liquid cooled radiator module 724 is used in conjunction with the processor air cooler 208 to decrease the preheated airflow temperature of the processor 104a. In another embodiment, there may be an additional liquid cooled radiator module 724 positioned over the processor 104b. Including the radiator in the liquid cooled module 724 helps with space constraints and limits the tubing used from daisy chaining the liquid module cooler to a radiator in another part of the chassis 514.

Figure 8:
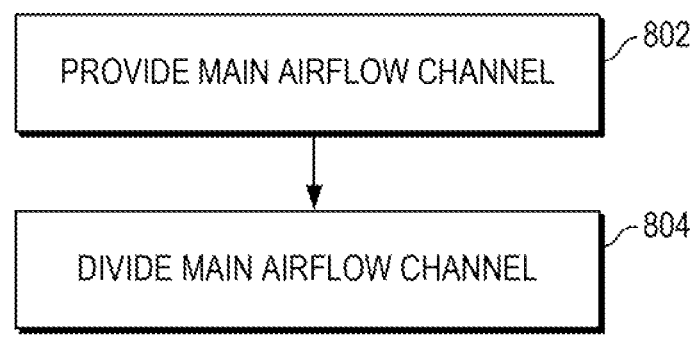
FIG. 8 is a flowchart of an example method to manufacture a removable airflow guide assembly.

FIG. 8 is a flowchart of an example method to manufacture a removable airflow guide assembly. Although FIG. 8 may be described as performed on a computing device, it may also be executed on computing device 500 and 700 as in FIG. 5 and FIG. 7, respectively, it may also be executed on other suitable components as will be apparent to those skilled in the art. For example, FIG. 8 may be implemented in the form of executable instructions on a machine-readable storage medium, such as memory banks 106a-106d or processor 104 as in FIG. 1.

At operation 802 provides a main airflow channel in a chassis for processors and memory banks on a circuit board. Embodiments of operation 802 include attaching various components on the circuit board and/or positioning within the chassis. The internal aspect of the chassis provides a main airflow channel.

At operation 804 a main airflow channel within a chassis of a computing device is divided into a memory bank airflow channel using a removable airflow guide assembly. Additionally, this removable airflow guide assembly includes processor air coolers and memory bank coolers. Further, the processor air coolers are positioned to not directly align with processors on a circuit board. In one embodiment, the processor air coolers are positioned between 0 and 90 degrees to the circuit board. In another embodiment, the processor air coolers are positioned at substantially 45 degrees to the circuit board. In this embodiment, substantially 45 degrees to the circuit board includes +/−15 degrees, thus this may include a range between 30 degrees and 60 degrees.

The embodiments described in detail herein provide easier access to upgrade and/or service various internal computing device components by enabling the removable airflow guide assembly with the processor air cooler and memory bank coolers to be removed with a user-friendly single action. Further, example embodiments enable a more efficient manner to cool the various internal computing device components by preventing preheated air from each of the various internal computing device components to enter an inlet of each of the cooling units, thus providing cooler air to the various internal computing components.

We claim:

1. A removable airflow guide assembly for a computing device comprising:
    a processor air cooler to direct air over a processor positioned on a circuit board, the circuit board within a chassis and the processor air cooler is not directly aligned over the processor;
    memory bank coolers to direct air over memory banks positioned on the circuit board, each memory bank cooler aligned directly over each memory bank; and
    a connector socket to align with the circuit board, the connection to provide power to the processor air cooler and the memory bank coolers, wherein the processor air cooler, the memory bank coolers, and the connector socket are attached on the removable airflow guide assembly.

2. The removable air guide assembly of claim 1 wherein the processor air cooler is positioned between 0 and 90 degrees to the circuit board.

3. The removable air guide assembly of claim 1 further comprising:
    a first wall on a backside of the processor air cooler to deflect the flow of preheated air from the processor; and
    a second wall between the memory bank coolers to deflect the flow of preheated air from each of the memory banks.

4. The removable air guide assembly of claim 1 wherein an outlet for each of the memory bank coolers are offset from an inlet of the processor air cooler to prevent preheated air from each of the memory banks positioned on the circuit board to enter the inlet of the processor air cooler.

5. The removable air guide assembly of claim 1 wherein the processor air cooler is a first type of cooler and the memory bank coolers are a second type of cooler.

6. The removable air guide assembly of claim 1 wherein one of the memory bank coolers is an axial fan.

7. A computing device comprising:
    a chassis;
    a main airflow channel within the chassis;
    processors and memory banks positioned on a circuit board in the main airflow channel;
    a removable airflow guide assembly installed in the main airflow channel, the removable airflow guide assembly divides the main airflow channel into a processor airflow channel and a memory bank airflow channel;
    processor air coolers attached to the removable airflow guide assembly to direct air over the processors positioned on the circuit board, the processor air coolers not directly aligned over the processors; and
    memory bank coolers attached to the removable airflow guide assembly to direct air over the memory banks positioned on the circuit board, wherein each memory bank cooler directs air over each memory bank and wherein each memory bank cooler is aligned directly over each memory bank and wherein the processor air coolers, the memory bank coolers and a connector socket are attached on the removable airflow guide assembly.

8. The computing device of claim 7 wherein the processor air coolers attached to the removable airflow guide assembly are positioned at substantially 45 degrees to the processors on the circuit board.

9. The computing device of claim 7 wherein the memory hank coolers attached to the removable airflow guide assembly are positioned directly over the memory banks on the circuit board.

10. The computing device of claim 7 wherein the removable airflow guide assembly includes the connector socket to align with the circuit board, the connection provides power to the processor air coolers and the memory bank coolers.

11. The computing device of claim 7 wherein the removable airflow guide assembly further comprises an airflow guide cover and an inner airflow guide, the inner airflow guide is attached to the processor air coolers and the memory bank coolers.

12. The computing device of claim 7 wherein the removable airflow guide assembly further comprises a first wall between the processor air coolers to deflect the flow of preheated air from each of the processors and a second wall between the memory bank coolers to deflect the flow of preheated air from each of the memory banks.

13. The computing device of claim 7 wherein the memory banks are positioned on each side of one of the processors.

14. The computing device of claim 7 further comprising:
    a liquid cooled radiator module positioned substantially over one of the processors.

15. A method comprising:
    providing a main airflow channel in a chassis for processors and memory banks on a circuit board; and
    dividing the main airflow channel into a processor side airflow channel and a memory side airflow channel using a removable airflow guide assembly;
    wherein the removable airflow guide assembly includes processor air coolers and memory bank air coolers, the processor air coolers are not directly aligned over the processors and each memory bank air cooler directs air over each memory bank and wherein each memory bank cooler is directly aligned over each memory bank and wherein the processor air coolers, the memory bank coolers and a connector socket are attached on the removable airflow guide assembly.

* * * * *